United States Patent
Schmalzrieth et al.

(10) Patent No.: US 11,628,719 B2
(45) Date of Patent: Apr. 18, 2023

(54) SINGLE-WHEEL DRIVE COMPONENT FOR A MOTOR VEHICLE AND CORRESPONDING MOTOR VEHICLE

(71) Applicant: AUDI AG, Ingolstadt (DE)

(72) Inventors: Sven Schmalzrieth, Ingolstadt (DE); Advait Valluri, Ingolstadt (DE); Vladimir Idelevitch, Nuremberg (DE); Marcus Wilde, Mittweida (DE)

(73) Assignee: AUDI AG, Ingolstadt (DE)

( * ) Notice: Subject to any disclaimer, the term of this patent is extended or adjusted under 35 U.S.C. 154(b) by 297 days.

(21) Appl. No.: 16/755,267

(22) PCT Filed: Oct. 30, 2018

(86) PCT No.: PCT/EP2018/079757
§ 371 (c)(1),
(2) Date: Apr. 10, 2020

(87) PCT Pub. No.: WO2019/096580
PCT Pub. Date: May 23, 2019

(65) Prior Publication Data
US 2020/0238816 A1    Jul. 30, 2020

(30) Foreign Application Priority Data

Nov. 15, 2017   (DE) .................... 10 2017 220 312.9
Jun. 13, 2018   (DE) .................... 10 2018 209 418.7

(51) Int. Cl.
*B60G 3/06* (2006.01)
*B60K 7/00* (2006.01)

(52) U.S. Cl.
CPC .............. *B60K 7/0007* (2013.01); *B60G 3/06* (2013.01); *B60G 2200/156* (2013.01);
(Continued)

(58) Field of Classification Search
CPC .......... B60K 7/0007; B60K 2007/0046; B60K 2007/0061; B60G 3/06; B60G 2200/156;
(Continued)

(56) References Cited

U.S. PATENT DOCUMENTS 11,505,061 B2 * 11/2022 Mepham .................. B60K 1/00
2013/0240273 A1 * 9/2013 Langer ................ H01M 50/249
180/55
(Continued)

FOREIGN PATENT DOCUMENTS

CN        104640720 A        5/2015
CN        105882741 A        8/2016
(Continued)

OTHER PUBLICATIONS

German Examination Report dated Jan. 25, 2022, in connection with corresponding German Application No. 102018209418.7 (11 pp., including machine-generated English translation).
(Continued)

*Primary Examiner* — James A Shriver, II
*Assistant Examiner* — Michael T. Walsh
(74) *Attorney, Agent, or Firm* — Maier & Maier, PLLC

(57) ABSTRACT

A single-wheel drive component for a motor vehicle, having a drive assembly and a wheel carrier, on which a wheel hub, which can be driven by the drive assembly, is rotatably mounted by a wheel bearing. At least one assembly support for mounting the drive assembly on a body of the motor vehicle originates from the drive assembly. It is provided in this case that an assembly bearing for elastic mounting of the drive assembly on the body is arranged on the assembly support. At least one control arm is articulated on the wheel bearing on one side and on the assembly support on the other side, in order to mount the wheel carrier.

11 Claims, 3 Drawing Sheets

(52) U.S. Cl.
CPC .. *B60G 2200/422* (2013.01); *B60G 2204/147* (2013.01); *B60K 2007/0046* (2013.01); *B60K 2007/0061* (2013.01)

(58) Field of Classification Search
CPC ........ B60G 2200/422; B60G 2204/147; B60G 3/225; B60G 2200/1322; B60G 2204/00; B60G 2204/10; B60G 2204/112; B60G 2204/128; B60G 2204/14; B60G 2204/143
See application file for complete search history.

(56) References Cited

U.S. PATENT DOCUMENTS

| | | | | |
|---|---|---|---|---|
| 2014/0262588 | A1* | 9/2014 | Bruns | B60K 1/00 180/291 |
| 2019/0308475 | A1* | 10/2019 | Wentworth | B60G 7/001 |
| 2022/0314721 | A1* | 10/2022 | Okuyama | B60G 7/001 |
| 2022/0320946 | A1* | 10/2022 | Varela | H02K 5/203 |

FOREIGN PATENT DOCUMENTS

| | | | | |
|---|---|---|---|---|
| CN | 105882741 A * | 8/2016 | ............ | B60G 3/20 |
| DE | 102004022242 A1 | 1/2005 | | |
| DE | 102010023985 A1 | 8/2011 | | |
| DE | 102010023985 A1 * | 8/2011 | ............ | B60G 3/20 |
| DE | 102012011797 A1 | 1/2013 | | |
| DE | 102011081836 A1 * | 2/2013 | ............ | B60K 1/00 |
| DE | 102011054580 A1 | 4/2013 | | |
| DE | 102011054580 A1 * | 4/2013 | ............ | B60G 3/06 |
| DE | 102013213656 A1 * | 1/2014 | ............ | B60G 11/08 |
| DE | 102012019870 A1 | 4/2014 | | |
| DE | 10 2013 007976 A1 | 11/2014 | | |
| DE | 102014102541 A1 | 8/2015 | | |
| DE | 102014102541 A1 * | 8/2015 | ............ | B60G 3/20 |
| DE | 102016007496 A1 | 12/2017 | | |
| DE | 102016007496 A1 * | 12/2017 | | |
| FR | 2691930 A1 * | 12/1993 | ......... | B60G 21/0551 |
| FR | 2691930 A1 | 12/1993 | | |
| WO | 2012/113500 A1 | 8/2012 | | |
| WO | 2014/195105 A1 | 12/2014 | | |
| WO | WO-2014195105 A1 * | 12/2014 | ............ | B60G 3/20 |
| WO | 2016/166432 A1 | 10/2016 | | |
| WO | WO-2016166432 A1 * | 10/2016 | | |

OTHER PUBLICATIONS

International Search Report with English translation and Written Opinion with machine translation dated Feb. 20, 2019 in corresponding International Application No. PCT/EP2018/079757; 27 pages.
International Preliminary Report on Patentability (Chapter I) dated May 19, 2020, in corresponding International application No. PCT/EP2018/079757; 11 pages.
Office Action dated May 12, 2021 in corresponding German Application No. 18 799 692.1; 14 pages including machine-generated English-language translation.
Office Action dated Oct. 31, 2022, in corresponding Chinese Application No. 201880073699.0, 14 pages.

* cited by examiner

SINGLE-WHEEL DRIVE COMPONENT FOR A MOTOR VEHICLE AND CORRESPONDING MOTOR VEHICLE

FIELD

The disclosure relates to a single-wheel drive component for a motor vehicle, having a drive assembly and a wheel carrier, on which a wheel hub, which can be driven by the drive assembly, is rotatably mounted by means of a wheel bearing, wherein at least one assembly support for mounting the drive assembly on a body of the motor vehicle originates from the drive assembly. The disclosure further relates to a motor vehicle.

BACKGROUND

Publication DE 10 2012 019 870 A1, for example, is known from the prior art. It discloses a wheel suspension for a rear wheel of a motor vehicle, comprising a wheel carrier, which is articulated on a module support via an upper transverse control arm and a lower transverse control arm, wherein the two transverse control arms are each mounted on the module support so as to pivot about a pivoting axis. In doing so, it is provided that the two pivoting axes of the transverse control arms are arranged parallel to one another and parallel to the roadway as well as parallel to the vehicle longitudinal direction, and that the wheel carrier forms an effective connection with a lane controller, wherein the lane controller is mounted in a supported manner on the lower transverse control arm.

Furthermore, a vehicle is known from WO 2014/195105 A1, comprising a body, a surface component arranged under the body, and at least one axle-beam assembly for two front or two rear wheel suspensions, with a left control arm mount for connecting at least one control arm of the left wheel suspension, and a right control arm for connecting at least one control arm of the right wheel suspension, wherein the two control arm mounts are each attached to the body and to the surface component, wherein the two control arm mounts are two separate components not directly connected, and wherein the surface component is formed as an underbody, preferably as a lower, aerodynamically optimized finish of the vehicle.

SUMMARY

The object of the disclosure is to propose a single-wheel drive component for a motor vehicle, which has advantages over known single-wheel drive components, particularly improved acoustic properties.

This is achieved according to the disclosure with a single-wheel drive component for a motor vehicle. It is provided in this case that an assembly bearing for elastic mounting of the drive assembly on the body is arranged on the assembly support, wherein at least one control arm is articulated on the wheel bearing on one side and on the assembly support on the other side, in order to mount the wheel carrier.

The single-wheel drive component is used to drive a motor vehicle, that is to provide a torque based on the driving of the motor vehicle. The torque in this case is preferably transferred via precisely only one wheel, or is provided at this wheel. The single-wheel drive component forms a single-wheel drive of the motor vehicle in this regard. The wheel can be connected or is connected to the wheel hub. The wheel is driven via the wheel hub. In order to drive the wheel hub, the single-wheel drive component has the drive assembly, which is effectively connected, particularly in a non-torsional manner, to the wheel hub at least sometimes, preferably permanently. The drive assembly is preferably in the form of an electric motor, which can be characterized as a traction motor. For rotatable mounting of the wheel hub, the single-wheel drive component has the wheel bearing, by means of which the wheel hub is rotatably mounted on the wheel carrier, which is likewise a component of the single-wheel drive component.

The single-wheel drive component and/or the individual components thereof can be connected to a body of the motor vehicle and/or are connected to the body after assembly is complete. To this end, the drive assembly has assembly supports, by means of which the drive assembly is connected to the body. The assembly support preferably originates from a motor housing of the drive assembly and especially preferably extends in a radial direction outward starting from the motor housing as relates to an axis of rotation of a drive shaft of the drive assembly. The assembly bearing is positioned on the assembly support such that the drive assembly is supported elastically on the body. To this end, the assembly bearing is designed accordingly.

The assembly bearing is used to damp vibrations between the drive assembly and the body. In this regard, the assembly bearing prevents vibrations from being transferred from the drive assembly to the body to the extent that any impact on driving comfort caused by such vibrations is reduced or even completely eliminated. Preferably, one embodiment of the assembly bearing is implemented as a hydraulic assembly bearing, because it implements especially efficient vibration damping.

In addition to mounting the drive assembly on the body, it is also necessary to mount or support the wheel carrier on the body. In this case, it is known to articulate the wheel carrier on the body via one or more control arms such that, i.e., the one or more control arms engage at the wheel carrier on one side and the body directly on the other side. In contrast, it is provided according to the disclosure that the at least one control arm is articulated on the wheel carrier on one side and at the assembly support on the other side.

Thus, the control arm engages at the wheel carrier (directly) on one side and the assembly support (directly) on the other side. In other words, this means that the control arm is articulated on the body via the assembly support. Accordingly, the control arm is preferably always situated apart from the body during proper operation of the single-wheel drive component and/or of the motor vehicle, i.e. it is not adjacent said component or does not engage at said component.

The articulation of the control arm on the assembly support has the advantage that the control arm is mounted on the body, in the end, via the assembly bearing. Accordingly, the assembly bearings do not only damp vibrations between the drive assembly and the body but additionally between the control arm and thus the wheel carrier on one side and the body on the other side. The control arm is preferably designed as a transverse control arm. However, it may alternatively be designed as a longitudinal control arm.

In addition, a further positive effect may result—as a function of the design of the assembly bearing—said effect being beneficial to the driving comfort of the motor vehicle. Due to the support of the wheel carrier on the body via the at least one assembly bearing, an inward rotation of the entire single-wheel drive component as relates to the body may occur about an axis, which is perpendicular to the axis of rotation, upon the application of a lateral force onto the motor vehicle and/or the single-wheel drive component, i.e. a force in the direction of the axis of rotation of the drive shaft of the drive assembly. Due to the elasticity of the assembly bearing, this inward rotation is likewise elastic to the extent that, in the end, advantageous elastokinematic behavior of the single-wheel drive component is achieved.

It is obviously especially preferable to use several assembly supports to mount the drive assembly on the body of the motor vehicle. Likewise, preferably several control arms are provided for mounting the wheel carrier on the assembly supports and thus on the body. For example, the several control arms then engage at different assembly supports. Conversely, at least one of the control arms thus engages at several of the assembly supports or even at all of the assembly supports. In the end, this means that the wheel carrier is connected to several of the assembly supports and/or articulated thereupon via several control arms.

The at least one control arm or each of the several control arms may each be designed, for example, as multilink control arms or triangular control arms. In the case of the multilink control arm, the control arm preferably establishes a connection between the wheel carrier and the assembly support or one of the assembly supports. In contrast, if the control arm is designed as a triangular control arm, it may be provided that it engages at the wheel carrier or is articulated thereupon on one side and articulated at several of the assembly supports on the other side. In this regard, the wheel carrier is connected to several of the assembly supports or articulated thereupon via the triangular control arm.

A further preferred embodiment of the disclosure provides that a mounting flange, to which the assembly support is attached, is formed on the drive assembly. The mounting flange should be considered a protrusion, which protrudes over an outer circumference of a motor housing of the drive assembly or originates therefrom. The mounting flange in this respect represents, for example, a material thickening of the motor housing. The mounting flange may be designed separately from the motor housing and be attached thereto subsequently, preferably with a firm bond, particularly by welding. However, it may also be provided that the mounting flange is formed together with the motor housing. In this respect, the mounting flange is formed with the motor housing as a single piece and has uniform material.

The single-wheel drive components may be assigned to precisely one of several wheel axles of the motor vehicle. However, it is especially preferred when several single-wheel drive components are assigned to several wheel axles, particularly all wheel axles, of the motor vehicle. In this respect, the motor vehicle may have several driven wheel axles. For example, the motor vehicle may be in the form of an all-wheel drive vehicle, in which all wheels of the motor vehicle can each be driven by means of a single-wheel drive component.

A further preferred embodiment of the disclosure provides that a bearing, by means of which the control arm is articulated on the assembly support, is attached to a bearing bracket, which is rigidly attached to the assembly support. Thus, the bearing bracket is formed on the assembly support and is rigidly connected and/or attached thereto. The bearing bracket in this case may be designed separately from the assembly support and be attached thereto subsequently, for example attached with a firm bond, particularly by welding. However, it may also be provided that the bearing bracket is formed with the assembly support as a single piece and/or with uniform material, for example by reshaping the assembly support.

The bearing is attached to the assembly support via the bearing bracket. The bearing is used for pivotable mounting of the control arm on the assembly support. In this regard, the bearing is in the form of a pivot bearing, which implements pivotable mounting of the control arm, particularly so as to pivot on the assembly support about a pivoting axis. An especially high degree of driving comfort of the motor vehicle is achieved due to the mounting of the control arm on the assembly support by means of the bearing.

One refinement of the disclosure provides that the bearing is designed as a rubber bearing, rubber-metal bearing, or as a ball bearing. What these types of bearings have in common is that they permit a pivot movement of the control arm about the pivoting axis as relates to the assembly support. A translatory deflection of the control arm as relates to the assembly support, for example in the axial, radial, and/or tangential direction, and/or a pivot movement about an axis different from the pivoting axis, for example about an axis parallel to the pivoting axis, is exclusively permitted elastically by the bearing. This means that the bearing exerts a reset force on the control arm with such type of deflection. This particularly applies in the case of the translatory deflection.

Within the scope of a further preferred embodiment of the disclosure, it may be provided that the assembly support has a pipe profile, at least in areas. Thus, the assembly support is formed as a hollow profile, which is preferably completely closed as viewed in the cross-section, particularly along its entire longitudinal extension. In the end, this means that the assembly support is hollow and/or preferably has a contiguous hollow space in the axial direction. On the one hand, this enables significant weight reduction as compared to a solid design of the assembly supports and, on the other hand, simple production, because the assembly support can be simply reshaped due to the design as a pipe profile or hollow profile.

The reshaping preferably occurs such that the assembly support is in contact with or nestled within further components of the single-wheel drive component and/or of the motor vehicle, or passes by them some distance away, after mounting on the motor vehicle. In addition, the reshaping of the assembly support enables the capturing of a kinematic point of the control arm in different spatial positions in that the assembly support is spatially reshaped such that the bearing bracket attached thereto captures a center of gravity of the control arm.

A further preferred embodiment of the invention provides that a mounting flange, to which the assembly support is attached, is formed on the drive assembly. The mounting flange should be considered a protrusion, which protrudes over an outer circumference of a motor housing of the drive assembly or originates therefrom. The mounting flange in this respect represents, for example, a material thickening of the motor housing. The mounting flange may be designed separately from the motor housing and be attached thereto subsequently, preferably with a firm bond, particularly by welding. However, it may also be provided that the mounting flange is formed together with the motor housing. In this respect, the mounting flange is formed with the motor housing as a single piece and has uniform material.

The mounting flange is preferably provided and designed for a detachable mounting of the assembly support. This means that the assembly support can be detached, after assembly thereof, from the mounting flange without damage. For example, the assembly support is attached to the mounting flange with a firm bond and additionally secured thereupon, for example, by means of a screw connection.

However, it may also be provided that the assembly support is attached to the mounting flange exclusively via such screw connection. In this case, the mounting flange may also be characterized as a screwed flange. The formation of the mounting flange on the drive assembly has the advantage that a simple and reliable connection of the assembly support to the drive assembly is ensured.

A preferred further embodiment of the disclosure provides that, in addition to the assembly support, at least one further assembly support originates from the drive assembly, on which a further assembly bearing is arranged for elastic mounting of the drive assembly on the body. The further assembly support is preferably designed similarly to the assembly support to the extent that the remarks regarding the assembly support within the scope of this description can preferably be applied, individually or in combination with one another, to the further assembly support. The further assembly support may be refined in this regard according to these statements. The further assembly support is also used for elastic mounting of the drive assembly on the body. To this end, it originates from the drive assembly or the motor housing thereof and has the further assembly bearing on the other side. Reference is made to the remarks regarding the assembly bearing within the scope of this description as well with respect to the further assembly bearing.

After mounting of the single-wheel drive component on the motor vehicle, the drive assembly is connected to the body of the motor vehicle via the assembly support and via the further assembly support, namely connected in a manner so as to damp vibrations via the assembly bearing and the further assembly bearing. The use of several assembly supports and several assembly bearings has the advantage that the quantity of energy transferred via each of the assembly supports and/or each of the assembly bearings is divided to the extent that, in the end, greater driving comfort is implemented.

A preferred refinement of the disclosure provides that the assembly support and the further assembly support are attached to the drive assembly separately from one another or via a common mounting foot. Thus, the assembly support and the further assembly support may be formed as separate components and likewise attached to the mounting flange or to the drive assembly separately from one another. This has the advantage that the single-wheel drive component is designed modularly and can be reproduced flexibly.

In the event of separate attachment of the assembly support and the further assembly support to the drive assembly, the assembly supports and the further assembly support may be arranged apart from one another as relates to the drive assembly. For example, the two assembly supports are situated on opposite sides of the drive assembly; especially preferably, they engage, while diametrically opposed, at the drive assembly or the motor housing thereof.

Alternatively, it may also be provided that the assembly support and the further assembly support have the common mounting foot and are attached to the mounting flange via said mounting foot. The assembly support and the further assembly support are designed as a single piece in the mounting foot, i.e. they converge in the mounting foot. Thus, the assembly support and the further assembly support are jointly attached or can be jointly attached to the mounting flange via the mounting foot. This simplifies mounting of the assembly supports on the drive assembly significantly.

A further especially preferred embodiment of the disclosure provides that, in order to mount the wheel carrier, at least one further control arm is articulated on the wheel carrier on one side and on the further assembly support on the other side, or that the control arm is articulated on both the assembly support and the further assembly support. The further control arm is provided in addition to the control arm. With respect to the further control arm, reference is made to the remarks regarding the control arm within the scope of this description, which can be applied individually or in combination in order to refine the further control arm.

The further control arm is likewise used to mount the wheel carrier and, to this end, engages it on one side and the further assembly support on the other side. In other words, the wheel carrier is articulated on the assembly support via the control arm and articulated on the further assembly support via the further control arm. The assembly support and the further assembly support with this type of embodiment can be attached to the drive assembly separately from one another or via the common mounting foot.

Alternatively, the control arm may engage at or be articulated on both assembly supports, i.e. at/on the assembly support and the further assembly support. In this case, the control arm is preferably designed as a triangular control arm. On one side, the control arm is thus articulated on the wheel carrier and, on the other side, the control arm is articulated on the assembly support and on the further assembly support. With such type of design, the assembly support and the further assembly support preferably engage at the drive assembly or the motor housing thereof apart from one another; in particular, they are arranged on opposite sides of the drive assembly.

Within the scope of an especially preferred further embodiment of the disclosure, it is provided that the assembly support and the further assembly support are formed jointly as one assembly support component by means of a single-part and material-uniform design. Reference has previously been made in this document to the possibility of the common mounting foot. The design as an assembly support component is especially advantageous when several assembly supports and/or several further assembly supports are used. In this case, an especially simple mounting of the single-wheel drive component is ensured. The assembly support component in this case may be a component of the motor housing of the drive assembly or at least jointly form it in areas.

Finally, it is provided within the scope of a further design of the disclosure that a bracket for an additional assembly is provided on the assembly support and/or the further assembly support or that the additional assembly is attached to the assembly support and/or to the further assembly support. The additional assembly may essentially be designed as desired. For example, it may be an electrical or electronic assembly. The additional assembly may be present, for example, in the form of a control unit, particularly as a chassis control unit, a pump, a compressor, a capacitor, or an equalization tank.

The additional assembly may be provided and designed for direct attachment to the bracket and/or to the assembly support and/or to the further assembly support. However, it may also be provided that only an indirect attachment of the additional assembly to the bracket and/or to the assembly support and/or to the further assembly support is implemented. For example, the additional assembly may be connected to the bracket via at least one bearing element, wherein the bearing element is preferably formed so as to damp vibrations. The bracket, for example, may be in the form of a mounting bracket for the additional assembly. The integration of the additional assembly into the single-wheel drive component for the motor vehicle enables an especially compact and space-saving design.

The disclosure further relates to a motor vehicle having a single-wheel drive component, particularly a single-wheel drive component according to the statements within the scope of this description, wherein the single-wheel drive component has a drive assembly and a wheel carrier, on which a wheel hub, which can be driven by the drive assembly, is rotatably mounted by means of a wheel bearing, wherein at least one assembly support for mounting the drive assembly on a body of the motor vehicle originates from the drive assembly. It is provided in this case that an assembly bearing for elastic mounting of the drive assembly on the body is arranged on the assembly support, wherein at least one control arm is articulated on the wheel bearing on one side and on the assembly support on the other side, in order to mount the wheel carrier.

Reference has already been made to the advantages of such an embodiment of the single-wheel drive component and/or of the motor vehicle. Both the motor vehicle as well as the single-wheel drive component may be further refined according to the statements within the scope of this description, to the extent that reference is made to them.

BRIEF DESCRIPTION OF THE DRAWINGS

The disclosure is explained in more detail in the following by means of figures, without limiting the disclosure. The following is shown.

DETAILED DESCRIPTION

Figure 1:
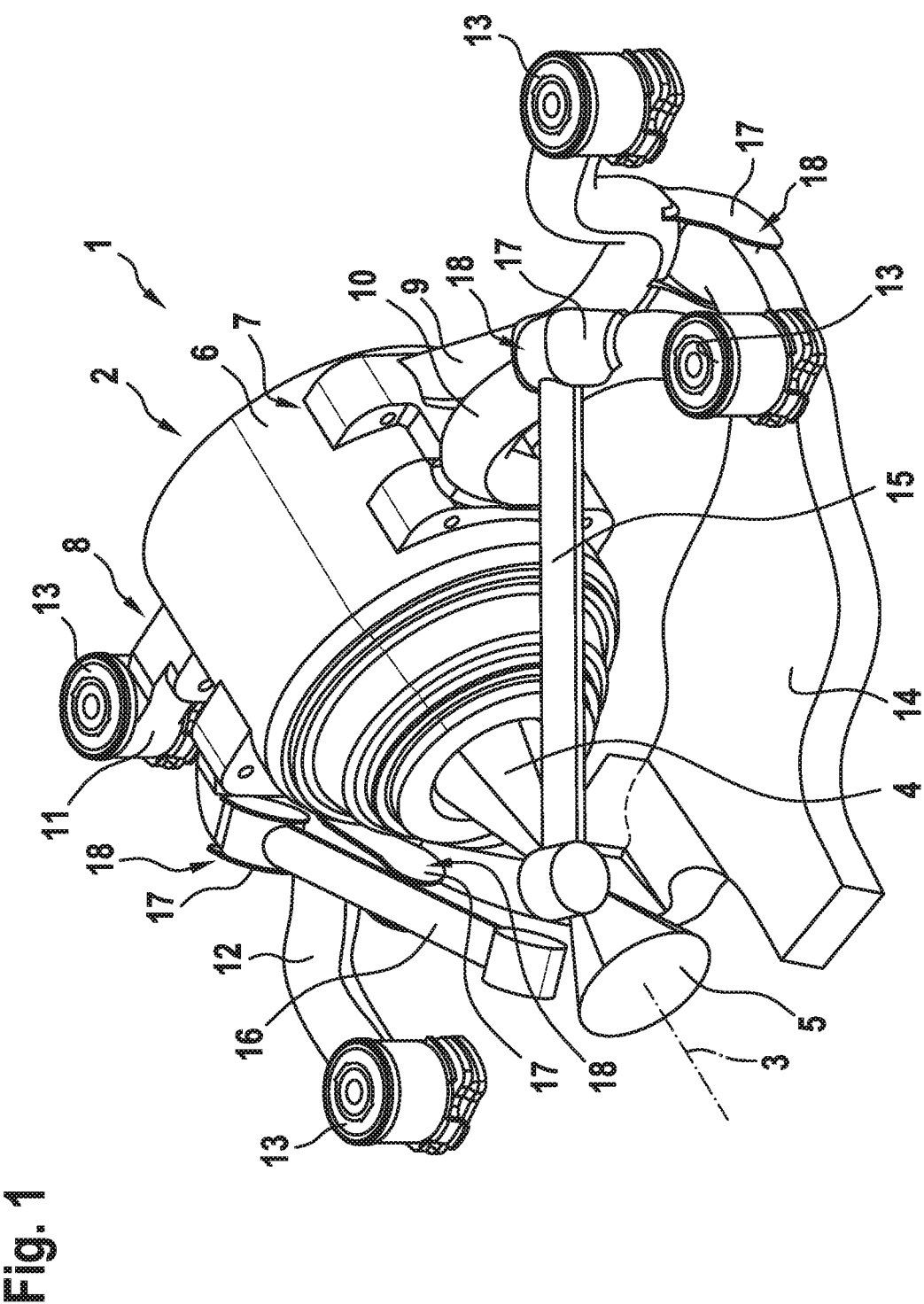
FIG. 1 a schematic view of an area of a single-wheel drive component for a motor vehicle.

FIG. 1 shows a schematic view of an area of a single-wheel drive component 1 for a motor vehicle. The single-wheel drive component 1 has a drive assembly 2, which has a drive shaft 4 which can rotate about an axis of rotation 3. The drive shaft 4 is preferably rigidly coupled to a cardan shaft 5, which is only shown here in very simplified form, or is designed as a cardan shaft 5. The drive assembly 2 and/or a drive shaft 4 is connected to a wheel hub, which is not shown here, of the single-wheel drive component 1 via the cardan shaft 5.

The drive assembly 2 has a motor housing 6, on which mounting flange 7 and 8 are formed. For example, mounting flange 7 and 8 are formed with the motor housing 6 as a single piece and with uniform material. Assembly supports 9 and 11 as well as further assembly supports 10 and 12 engage at the motor housing 6 and/or the drive assembly 2 via mounting flange 7 and 8.

Assembly supports 9, 10, 11, and 12 each have an assembly bearing 13 situated apart from the drive assembly 2. Assembly supports 9, 10, 11, and 12 and thus the drive assembly 2 can be coupled to a body, which is not shown here, of the motor vehicle via the assembly bearings 13, namely can be coupled in a vibration-damping manner. To this end, the assembly bearings 13 are elastic and formed, for example, as a hydraulic assembly bearing. In order to mount the wheel carrier, which is not shown here, on which a wheel hub is mounted by means of a wheel bearing, control arms 14 and 15 as well as a further control arm 16 are provided.

Control arms 14, 15, and 16 each engage at the wheel carrier on one side and at least one of assembly supports 9, 10, 11, and 12 on the other side.

In the exemplary embodiment shown here, control arm 14 is shown as a triangular control arm. Accordingly, it is articulated on several of assembly supports 9, 10, 11, 12, namely on assembly support 9 and assembly support 11. In contrast, control arms 15 and 16 are formed as multilink control arms. Control arm 15 engages at further assembly support 10, and further control arm 16 engages at further assembly support 12.

In order to connect control arms 14, 15, and 16 to assembly supports 9, 10, 11, and 12, a bearing bracket 17, in which a bearing 18 is retained, which is not shown here in detail, is formed at assembly supports 9, 10, 11, and 12. Control arms 14, 15, and 16 are each mounted in a pivotable manner on corresponding assembly supports 9, 10, 11, and/or 12, and/or the respective assembly supports 9, 10, 11, and 12, via the bearings 18. The bearings 18 may be designed as rubber bearings, rubber-metal bearings, or as ball bearings.

It can be seen that assembly supports 9 and 10, on one side, as well as assembly supports 11 and 12, on the other side, are each attached to the corresponding mounting flange 7 and/or 8 separately from one another. However, a common attachment may also be implemented; for example, to this end, assembly supports 9 and 10 or assembly supports 11 and 12 may each have a common mounting foot.

The design of the single-wheel drive component 1 described herein provides for an attachment of the wheel carrier to the body via assembly supports 9, 10, 11, and 12 and thus assembly bearing 13. Accordingly, an optimum vibration-damping design and/or connection is implemented to the extent that greater driving comfort is ensured for the motor vehicle.

Figure 2:
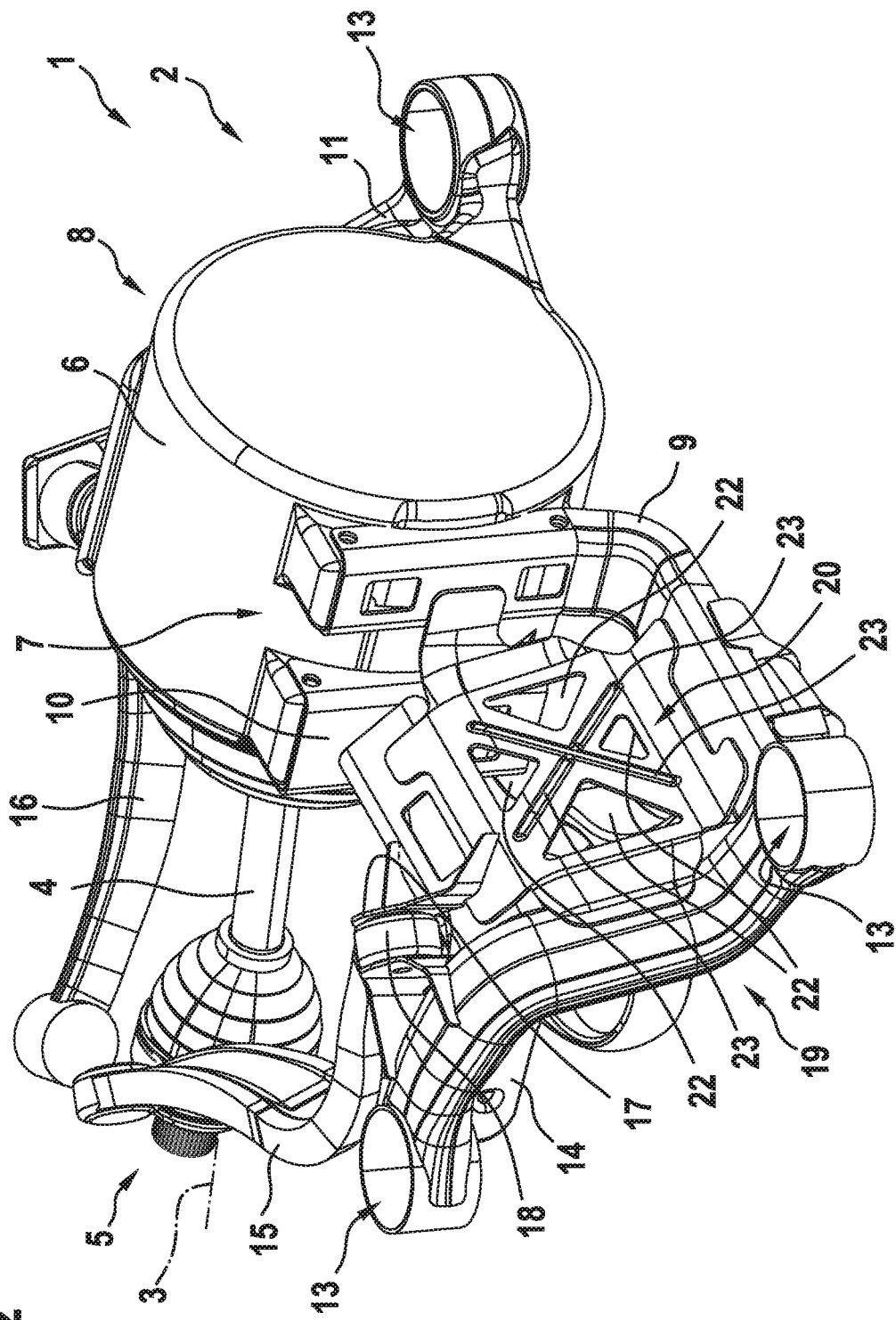
FIG. 2 a schematic view of the single-wheel drive component, wherein a bracket is provided for an additional assembly.

FIG. 2 shows a schematic view of the single-wheel drive component 1 in a different view and a slightly different design. Basically, reference is made to the previous statements and only the differences are addressed in the following. The differences are that assembly supports 9 and 10, on one side, as well as assembly supports 11 and 12, on the other side, are each jointly designed as an assembly support component 19.

As an addition or alternative to the single-part and material-uniform design of assembly supports 9 and 10 as an assembly support component 19, there is a bracket 20 for an additional assembly 21 (not shown) situated on assembly supports 9 and/or 10, common to both in the exemplary embodiment shown here. The bracket 20 is arranged and formed on the side of assembly supports 9 and 10 facing away from control arms 14, 15, and 16. In the axial direction as relates to the axis of rotation 3, the bracket 20 is situated between mounting points, at which assembly supports 9 and 10 are arranged and attached to the mounting flange 7.

The bracket 20 is present, for example, as a sheet metal part, which is attached to assembly support 9 at points spaced apart from one another. Additionally or alternatively, the bracket 20 may be attached to assembly support 10 at points spaced apart from one another. The attachment of the bracket 20 to assembly support 9 and/or to assembly support 10 is preferably with a firm bond. A firmly bonded attachment may also be implemented, however, in addition or as an alternative. The bracket 20 may have at least one passage 22, with there being four passages 22 in the exemplary embodiment shown here. These passages serve to reduce the weight and to ventilate the additional assembly 21. Additionally or alternatively, the bracket 20 may have one or more beads 23, which serve to reinforce the bracket 20.

Figure 3:
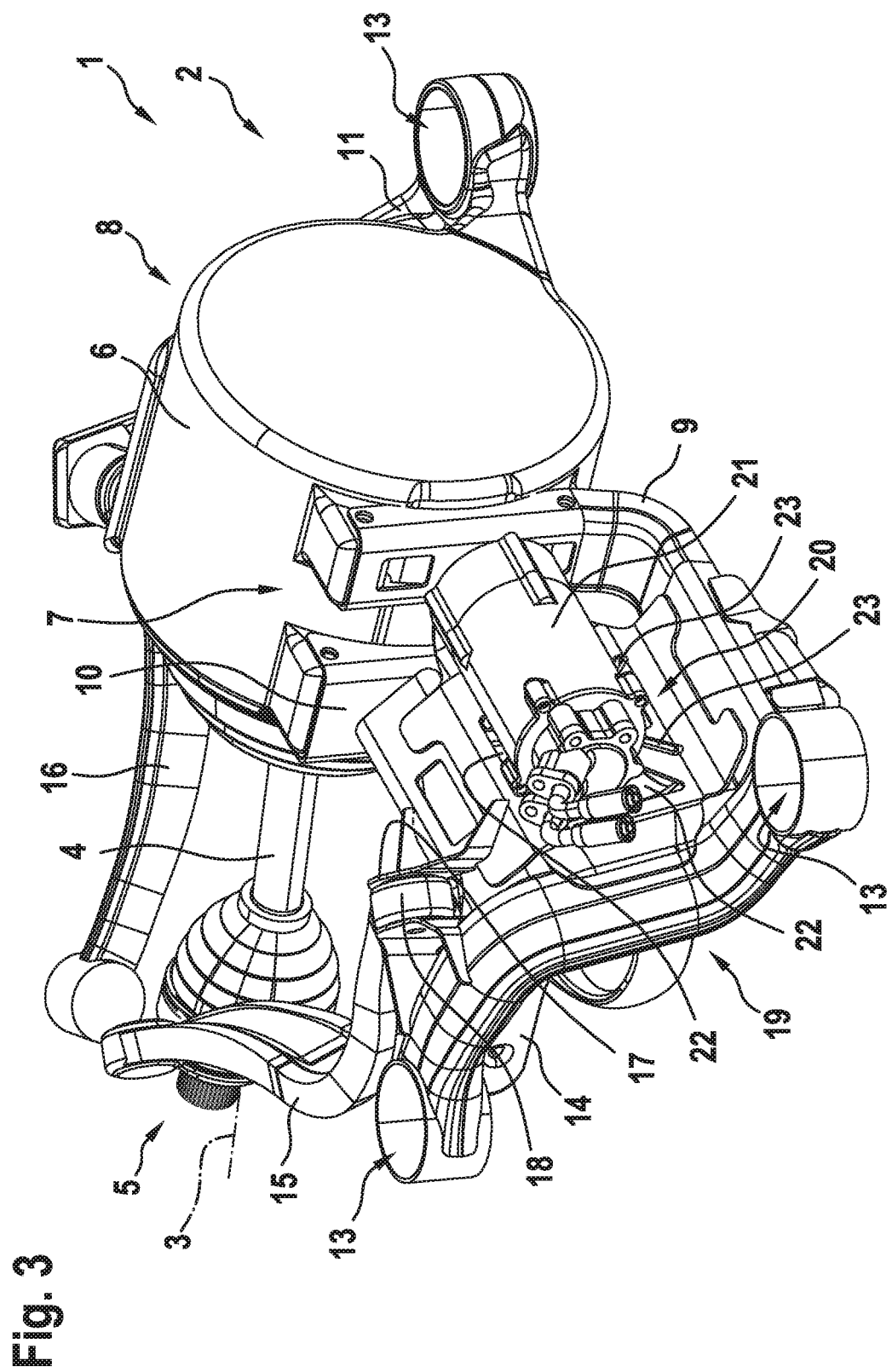
FIG. 3 a schematic view of the single-wheel drive component, wherein the additional assembly is arranged on and attached to the bracket.

FIG. 3 shows another view of the previously described single-wheel drive component 1. It can be seen that the additional assembly 21 is now attached to the bracket 20. In the exemplary embodiment shown here, the additional assembly 21 is in the form of a pump, which is provided and designed, for example, for operating an active chassis. The integration of the additional assembly 21 into the single-wheel drive component 1 and/or its attachment to assembly supports 9 and 10 enables an especially compact design and additionally provides good protection for the additional assembly 21 from external influences.

The invention claimed is:

1. A single-wheel drive component for a motor vehicle, comprising:
   a drive assembly and corresponding wheel carrier, on which a wheel hub, which is drivable by the drive assembly, is rotatably mounted by a wheel bearing, and
   at least one assembly support which extends between the drive assembly and a body of the motor vehicle,
   wherein the at least one assembly support is elastically mounted on the body of the motor vehicle by at least one assembly bearing,
   wherein at least one control arm is articulated on the wheel bearing on a first side and on the at least one assembly support on a second side to mount the wheel carrier, and
   wherein the wheel hub is independently drivable by the drive assembly.

2. The single-wheel drive component according to claim 1, wherein a control arm bearing, by which the at least one control arm is articulated on the at least one assembly support, is attached to a bearing bracket, which is rigidly attached to the at least one assembly support.

3. The single-wheel drive component according to claim 2, wherein the control arm bearing comprises at least one of a rubber bearing, a rubber-metal bearing, and a ball bearing.

4. The single-wheel drive component according to claim 1, wherein the at least one assembly support has a pipe-shaped profile, at least in areas.

5. The single-wheel drive component according to claim 1, wherein a mounting flange, to which the at least one assembly support is attached, is formed on the drive assembly.

6. The single-wheel drive component according to claim 1, wherein the at least one assembly support is a plurality of assembly supports, each elastically mounted on the body of the motor vehicle by at least one respective assembly bearing, and
   wherein the plurality of assembly supports are independently connected to the drive assembly.

7. The single-wheel drive component according to claim 1, wherein the at least one assembly support is a plurality of assembly supports, each elastically mounted on the body of the motor vehicle by a respective assembly bearing, and
   wherein the plurality of assembly supports are connected to the drive assembly via a common mounting foot.

8. The single-wheel drive component according to claim 6, wherein the at least one control arm is a plurality of control arms which are each articulated on the second side at a respective one of the plurality of assembly supports.

9. The single-wheel drive component according to claim 1, wherein the at least one assembly support is elastically mounted on the body of the motor vehicle by a plurality of assembly bearings.

10. A motor vehicle comprising the single wheel drive component according to claim 1.

11. The single-wheel drive component according to claim 7, wherein the at least one control arm is a plurality of control arms which are each articulated on the second side at a respective one of the plurality of assembly supports.

* * * * *